United States Patent [19]

Izumi

[11] Patent Number: 4,899,170

[45] Date of Patent: Feb. 6, 1990

[54] SELECTIVE ENERGIZATION OF THERMAL PRINTERS

[75] Inventor: Masaki Izumi, Tokyo, Japan

[73] Assignee: Eastman Kodak Company, Rochester, N.Y.

[21] Appl. No.: 288,316

[22] Filed: Dec. 22, 1988

[30] Foreign Application Priority Data

Dec. 22, 1987 [JP] Japan .............................. 62-324261

[51] Int. Cl.$^4$ .............................................. G01D 15/10

[52] U.S. Cl. ................................ 346/76 PH; 400/120

[58] Field of Search .................... 346/96 PH; 400/120

[56] References Cited

U.S. PATENT DOCUMENTS 4,745,413 5/1988 Brownstein et al. ........... 346/76 PH

FOREIGN PATENT DOCUMENTS 0130379 10/1981 Japan .............................. 346/76 PH 0202768 11/1984 Japan .............................. 346/76 PH

*Primary Examiner*—Teresa J. Walberg

*Assistant Examiner*—Huan Tran

*Attorney, Agent, or Firm*—Raymond L. Owens

[57] ABSTRACT

A thermal print head driver circuit which turns on and off each heating resistor at times uniformly distributed about the center (halfway) of the time to print a line (pixel interval).

2 Claims, 4 Drawing Sheets

SELECTIVE ENERGIZATION OF THERMAL PRINTERS

BACKGROUND OF THE INVENTION

1. Field of the Invention

The present invention relates to thermal printers wherein the selective energization of heating resistors causes the transfer of dye to a receiver member while minimizing line gaps.

2. Description of the Prior Art

Some thermal printer apparatus use a dye transfer process. In this process, a carrier containing a dye is disposed between a receiver, such as paper, and a print heat formed of, for example, a plurality of individual thermal heat producing resistors which we will refer to as heating resistors. The receiver is mounted on a rotatable drum. The receiver and carrier are generally moved relative to the print head which is fixed. When a particular heating element is energized, it is heated and causes dye to transfer (e.g. by sublimination) from the carrier to an image pixel in the receiver. The density, or darkness, of the printed dye is a function of the temperature of the heating element and the time the carrier is heated. In other words, the heat delivered from the heating element to the carrier causes dye to transfer to an image pixel of a receiver. The amount of dye is directly related to the amount of heat transferred to the carrier.

Thermal dye transfer printer apparatus offer the advantage of true "continuous tone" dye density transfer. By varying the heat applied by each heating element to the carrier, a variable dye density image pixel is formed in the receiver.

The print head heating resistors modulated (operated) in pulse width or pulse count modes of operation. In pulse width modulation a single constant current pulse is applied to each heating element. The pulse width of a constant current pulse causes its image pixel to have a desired gray scale. Pulse width modulation varies the percentage of the line printing time that a heating resistor is energized and thereby varies the time that the heating resistor is above the dye transfer temperature. In printing images, the individual heating elements must not be allowed to overheat and sustain permanent damage. In pulse count modulation, the number of constant current pulses is varied to produce the desired image pixel gray scale.

Using high pulse rate stepping motors or dc drive motors, most thermal printing systems rotate the drum and thereby provide relative motion between the heating elements and the receiver during printing. The reasons for producing this motion are to avoid overheating, sticking of the carrier due to the heat and maintaining relatively smooth motion for registration control. As the dye is deposited, there is some degree of smear which is desirable, since the image is supposed to be of a spatially continuous form and some smear helps to "integrate" the image pixels to the viewer. Due to this continuous motion of the receiver and the partial power duty cycle of the heating elements, some objectionable "gaps" between image lines can often be observed, depending on the actual size of the heating elements themselves. These gaps take the form of lines transverse to the direction of receiver movement, growing in perceptibility as the image density decreases.

To minimize these image line gaps, the area of the heating elements can be increased to cause successive lines to overlap. At lower and lower percentages of power cycles this solution has problems. First, the power required for a heating resistor to reach a desired temperature will increase as its area increases. Also, increasing the area of the heating resistor will reduce spatial resolution of the printed image.

An effective way of removing line gaps is set forth in commonly assigned U.S. Pat. No. 4,745,413 to Brownstein et al, wherein each heating resistor is energized during the first and second halves of a pixel time interval (line print time) to distribute heat to reduce line gaps.

SUMMARY OF THE INVENTION

It is an object of the present invention to provide an improved device for driving heating resistors to reduce line gaps. By turning on and off heating resistors at times uniformly distributed, line gaps can be even more effectively reduced.

According to one aspect of the invention, there is provided a head driving device for a continuous thermal transfer printer, comprising:

a driving circuit for selectively turning on and off a plurality of heating resistors incorporated in a thermal transfer printer head a number of times per pixel interval, the number of on times of each heating resistor corresponds to density gradation data associated with each pixel of a line in an image to provide a desired density gradation for each such pixel; and said driving circuit including means for turning on and off the heating resistors at times uniformly distributed about the center of each pixel interval.

DETAILED DESCRIPTION OF THE PREFERRED EMBODIMENT

Figure 1:
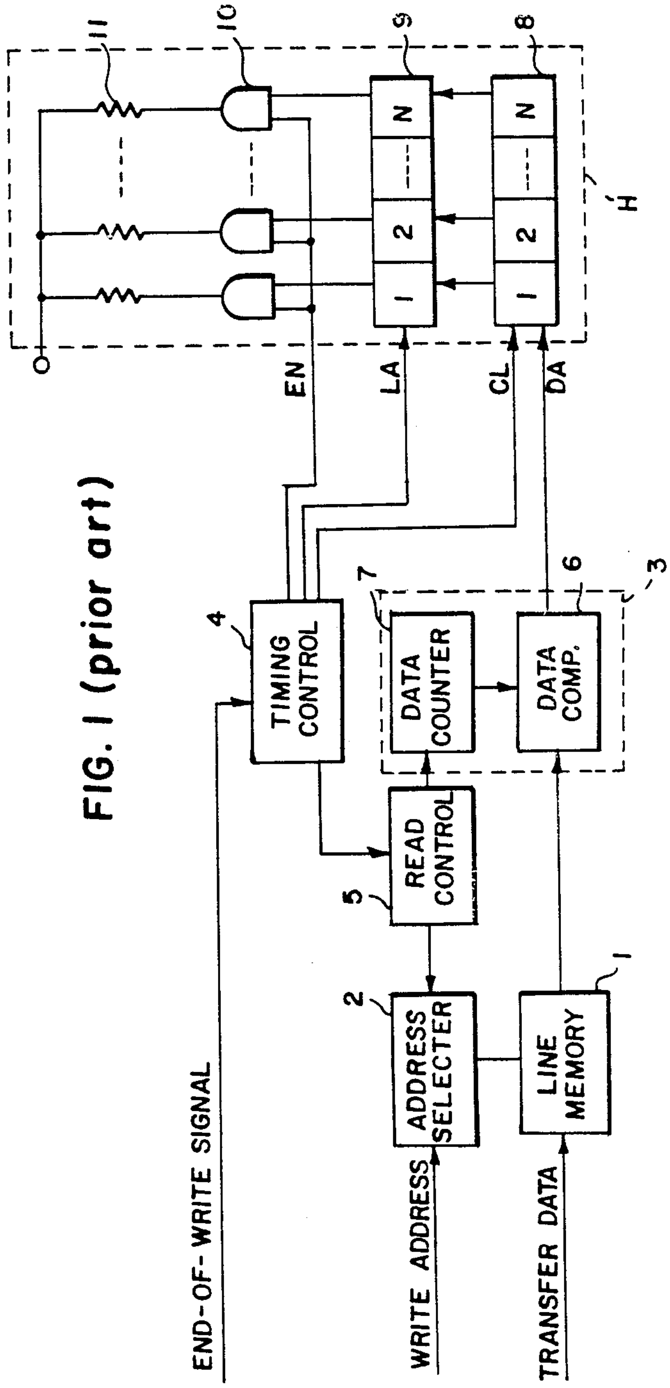
FIG. 1 (prior art)
FIG. 1 is a block diagram illustrating a conventional head driving device for a thermal transfer printer.

In FIG. 1 a prior thermal transfer printer head generally marked with H includes a shift register 8, a latch circuit 9, a gate circuit 10 and heating resistors 11. The shift register 8 and the latch circuit 9 have stages, the number of which is equal to that of the heating resistors. A driving circuit includes a line memory 1, an address selector 2, a data processing unit 3, a timing control circuit 4 and a readout control circuit 5. The data processing unit 3 has a data comparing circuit 6 and a data counter 7.

Transfer data (multivalue data) obtained by effecting line-scanning on an original such as a photo or the like are stored in the line memory 1 line by line in the scanning order. At this time, a write address is supplied through the address selector 2 to the line memory 1. When an image signal fetching control unit (not illustrated) transmits an end-of-write signal for indicating completion of storage of the transfer data for a line into the line memory 1, the timing control circuit 4 issues an instruction for initiating the transfer to the readout control circuit 5. Upon receipt of this instruction, the readout control circuit 5 provides a readout address via the address selector 2 to the line memory 1, in which place on-line transfer data stored therein is read. The thus read transfer data are supplied to the data comparing circuit 6. Simultaneously, the readout control circuit 5 feeds clock pulses to the data counter 7, from which 1 is outputted. Then, 1 is inputted to the data comparing circuit 6.

The data comparing circuit 6 serves to compare the respective density gradation data in the transfer of a line of data which has already been read with the value "1" which is output from the data counter 7. If the value of the density gradation data is equal to or greater than 1, 1 is the output. In the case of density gradation data with a value smaller than 1, 0 is the output. Thus, the output from the data comparing circuit 6 is a pulse train such that 1 is disposed in the position of the density gradation data the value of which is equal to or greater than 1, while the 0 is placed in the remaining positions.

Figure 2:
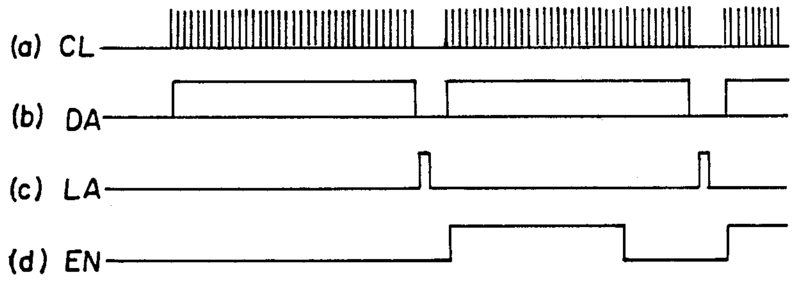
FIG. 2 (prior art)
FIG. 2 is a diagram showing output signal waveforms of respective portions in a driving system of FIG. 1.

A pulse train DA (FIG. 2(*b*)) output from the data comparing circuit 6 is timing-controlled by clock pulses CL (FIG. 2(*a*)) transmitted from the timing control circuit 4 and is then set in the shift register 8 incorporated in the thermal transfer printer head H. The timing control circuit 4 transmits a latch signal LA (FIG. 2(*c*)) to the latch circuit 9. Subsequently, the latch circuit 9 latches the data from the shift register 8. At this time, the timing control circuit 4 applies an enable signal EN (FIG. 2(*d*)) to the gate circuit 10, and hence only the heating resistors 11 corresponding to the stages which have latched 1 in the latch circuit 9 are selectively turned on, thereby causing the heating resistors to provide heat to a carrier. Therefore, ink on an ink film is dissolved or sublimated by the heat emitted by the heating resistors 11 and is transferred to a recording medium. The recording medium is mounted on a rotating drum (not shown) in the conventional fashion. The print head presses a carrier or ink film against the drum at a nip position during the time intended to print pixels of a line (pixel print time).

Next, the readout control circuit 5 functions to read again the same transfer data from the line memory 1 and causes 2 to be output from the data counter 7 this time. The data comparing circuit 6 makes a comparison between each item of density gradation data of the transfer data and 2. If the density gradation data is equal to or exceeds 2, 1 is the output. If smaller than 2, 0 is the output. Thus a pulse train is output from the data comparing circuit 6 and is set in the shift register 8 under control of the clock pulses CL transmitted from the timing control circuit 4. As in the above-described case, the heating resistors 11 corresponding to the stages in which 1 is set in the latch circuit 9 are thus driven, whereby dyes transferred to the recording medium. Thereafter, the same operations are repeated till the output from the data counter 7 becomes the number which indicates the maximum density gradation. In this way, the initial line transfer is completed.

Figure 3:
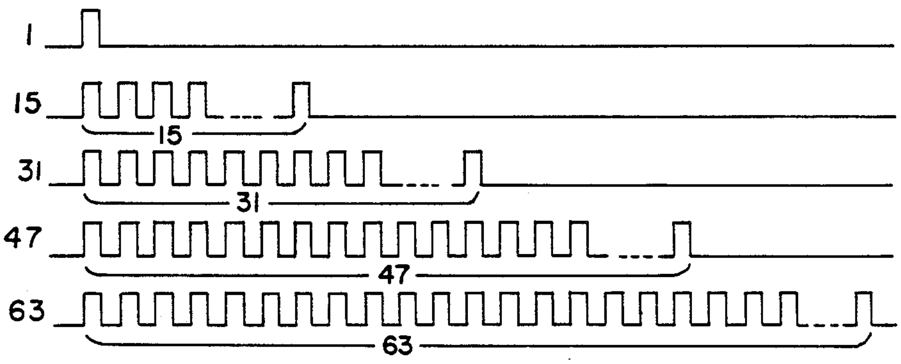
FIG. 3 (prior art)
FIG. 3 is a diagram showing output timings of pulses for driving heating resistors in the driving system of FIG. 1.

FIG. 3 diagrammatically shows, when concentrating attention on one of the heating resistors 11 of the thermal transfer printer head, how the timing at which this heating resistor is driven (turned on and off) in accordance with the density gradation data varies in the case of printing a line. As can be carried from FIG. 3, in the conventional thermal transfer printer head H, the heating resistor is driven a number of times corresponding to the density gradation data continuously from the time of the first transfer at a given time-interval which we will refer to as a pixel interval, irrespective of the value of the density gradation data. The time interval to print a line is, of course, the same as the interval to print any pixel in that line. Hence, when moving the ink film or carrier and the recording medium (receiver sheet) with respect to the head H little by little during the one-line transfer, a gap portion is left between the adjacent lines. As a result, there arises the line gap problem discussed above. In order to eliminate this problem, the timing at which the heating resistors are driven (turned on and off) may adequately be dispersed during a line printing period (pixel interval) in accordance with the density gradation data. Especially when the value of the density gradation data is small, driving the heating resistors in dispersed timing is quite effective. The present invention is made on the basis of such views. One embodiment of the present invention will hereinafter be described with reference to FIGS. 4 and 5.

Figure 4:
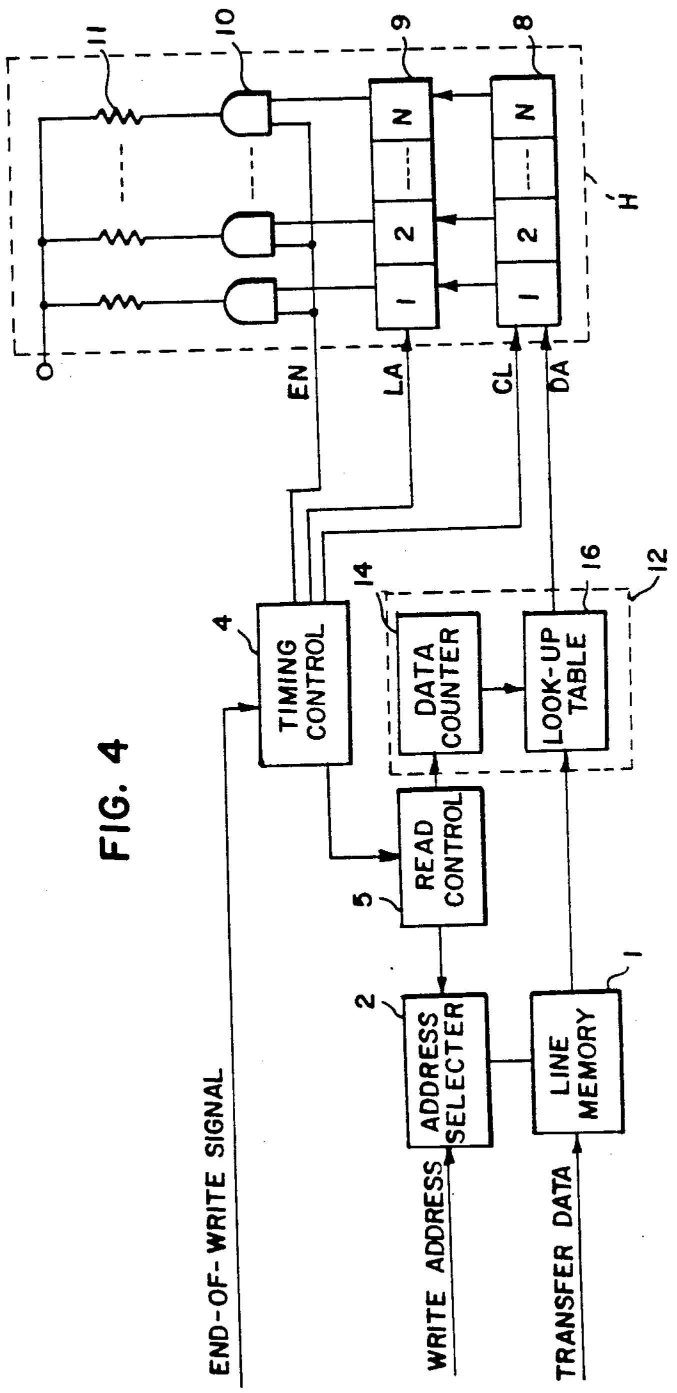
FIG. 4 is a block diagram conceptually illustrating a head driving device for a thermal transfer printer including a data processing unit having a head data look-up table in one embodiment of the present invention.

Turning attention to FIG. 4, there is illustrated a schematic diagram of one embodiment of a head driving device for a thermal transfer printer according to the present invention. In FIG. 4, components similar to those depicted in FIG. 1 are marked with the same reference numerals and symbols. When comparing the head driving device of FIG. 4 with the device of FIG. 1, it is understood that a data processing unit 12 substitutes for the data processing unit 3. The data processing unit 12 includes a data counter 14 and a head data look-up table 16. The data counter 14 has the same circuit as that of the data counter 7 used in conventional printers discussed above. The data counter 14 outputs frequency data indicating what number of times transfer is being effected in a line transfer process, that is, from 1 to the number equivalent to the maximum gradation, whenever receiving a clock pulse from the readout control circuit 5; and the frequency data is input to the head data look-up table 16. The line transfer data read from a line memory 1 is also input to the head data look-up table 16 and is temporarily stored therein. The head data look-up table 16 composed of, e.g., a ROM device stores a table prescribing the points of time at which 1 or 0 is output depending upon the value of the density gradation data so that the points of time at which the heating resistors are dispersed during a line printing period with respect to the frequency data (indicating one of the numbers from 1 through the maximum gradation) is output from the data counter 14, i.e., in accordance with the data as to what number of times of transfer is presently performed.

Now, the characteristics of the head data look-up table will be explained by giving a concrete example. For simplicity of explanation, it is assumed that the maximum gradation is 7 (the actual maximum gradation is, as a matter of course, much larger than 7, for example 256). Since the maximum gradation is 7, 1 to 7 are input from the data counter 14 to the head data look-up table 16 in the order from the first transfer to the seventh transfer during the on-line transfer period. It is assumed that the following table is written to the head data look-up table 16.

| transfer number density gradation data | 1 | 2 | 3 | 4 | 5 | 6 | 7 |
|---|---|---|---|---|---|---|---|
| 7 | 1 | 1 | 1 | 1 | 1 | 1 | 1 |
| 6 | 1 | 1 | 1 | 0 | 1 | 1 | 1 |
| 5 | 1 | 0 | 1 | 1 | 0 | 1 | 1 |
| 4 | 1 | 0 | 1 | 0 | 1 | 0 | 1 |
| 3 | 0 | 1 | 0 | 1 | 0 | 1 | 0 |
| 2 | 0 | 1 | 0 | 0 | 0 | 1 | 0 |
| 1 | 0 | 0 | 0 | 1 | 0 | 0 | 0 |
| 0 | 0 | 0 | 0 | 0 | 0 | 0 | 0 |

The table implies that, for instance, at the first time of transfer (the transfer number is 1, viz., when 1 is output from the data counter 14), 1 is the output from the head data look-up table 16 when the density gradation data 4 to 7 are input to the head data look-up table 16, while 0 is the output therefrom when the density gradation data 0 to 3 are input thereto.

Now, in extremely simplified transfer data scheme, let us assume a line to be transferred has 4 dots lengthwise, the values of density gradation data thereof being 0, 3, 5 and 7 in the order from left to right (scanning order). When such transfer data is input to table 16, a pulse train of 0, 0, 1, 1 being the output from the head data look-up table 16 at the first time of transfer on the basis of the table given above. This signal is input to the shift register 8 under the control of the clock pulses CL transmitted from the timing control circuit 4. The subsequent operations are the same as those shown in FIG. 1. At the second time of transfer, a pulse train of 0, 1, 0, 1 is the output from the head data look-up table 16 and is input to the shift register 8. Subsequently, pulse trains such as: 0, 0, 1, 1; 0, 1, 1, 1; 0, 0, 0, 1; 0, 1, 1, 1; and 0, 0, 1, 1 are the outputs from the head data look-up table 16 in sequence and input to the shift register 8 at the third to seventh time of transfer, respectively. Where the value of density gradation data is, e.g. 3, according to the prior art, the heating resistor is continuously driven during the period of the first to third time of transfer, whereas the resistor is not driven during the period of the fourth to seventh time of transfer. In contrast with this, according to the above-described example of the present invention, the heating resistor is driven at the dispersed second, fourth and sixth time of transfer among the seven times of transfer.

As is obvious from this example, in actual printing where the maximum gradation is remarkably large, the heating resistors associated with the small density gradation values are dispersedly driven during the line printing period. As a result, no untransferred portion is created even when moving the ink film and the recording medium while performing the line printing.

Figure 5:
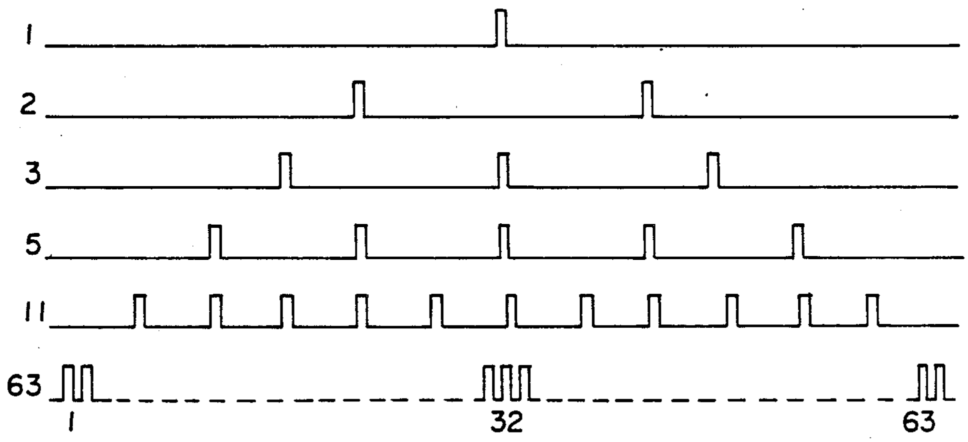
FIG. 5 is a diagram illustratively showing timings at which the pulses for driving the heating resistors are outputted from the head data look-up table.

FIG. 5 illustrates the points of time at which the pulses are output from the head data look-up table 16 with respect to some density gradation data when the maximum gradation is 63. The pulses corresponding to the respective density gradation data are uniformly dispersed during the period in which 63 pulses corresponding to the maximum gradation are output.

As discussed above, the points of time at which each heating resistor is driven are dispersed during the time to print a line which we refer to as a line transfer interval or as the pixel interval (time to print a pixel) so that the on times and off times for a pixel interval are uniformly distributed about the center of each pixel interval. With this arrangement it is possible to obtain more favorable continuity between the transferred portions of the contiguous lines than in the prior art regardless of a value of the density gradation data.

If the value of density gradation data is small, however, a time-interval between the point of time at which a heating resistor is driven on the basis of that data and the point of time of the next driving becomes longer than in the conventional example. Hence, in some cases the thermal accumulation effect of the head is reduced, and the amount of dye or ink to be transferred is also decreased, with the result that a desired gradation is probably not obtained. To avoid such a situation, the number of times the heating resistors are driven may be increased; or alternatively the period in which the heating resistors are driven may be lengthened. In the former case, the head data look-up table 16 may be so created that a greater number of pulses than that equivalent to the value of density gradation data are output. When the value of density gradation data is e.g. 3, table 16 can be arranged to output four or five pulses. In the latter case, the length of the enable signals output from the timing control circuit 4 may be weighted. For instance, when the value of density gradation data is 3, that is, when the transfer is effected three times during the on-line printing period, the enable signal at the second time of transfer can be arranged to be longer than that at the first and second time of transfer.

It should be noted that the pulses are not necessarily output from the head data look-up table 16 at uniformly dispersed points of time during the pixel transfer period. Essentially, in terms of the entire pixel transfer period, the head data look-up table 16 may be so arranged that a number of pulses corresponding to the density gradation data are dispersedly output during such a transfer period.

Figure 6:
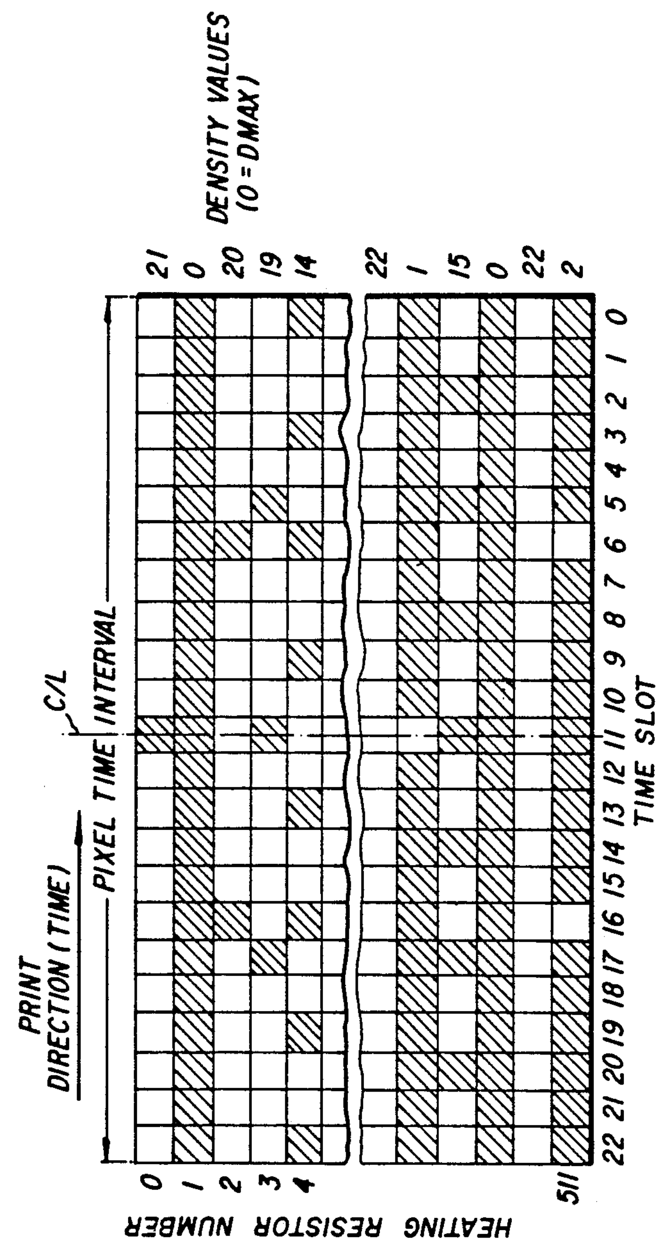
FIG. 6 is a schematic representation of the times the heating resistors of a thermal printer are turned on and off during a pixel interval.

Turning now to FIG. 6. we have the situation where there are 23 gradation density levels (dye density levels). In this example, FIG. 6 shows a scheme for sequencing the energization of heating resistors to attain different density levels for pixels of a single line. It will be noted that the energizations (shaded areas) of each given heating resistor occur during successive time slots until the desired density level is attained. The depicted modulation scheme has 23 density values which have value which vary from 0 to 22. The value "0" represents (Dmax) and 22 represents (Dmin). Also we will assume there are 512 heating resistors. The pixel time interval (time to print a line) can be considered to have 23 time slots. The time slot labeled 11 is the central time slot. The center line C/L is the midpoint in time of the pixel time interval. The heating resistors are uniformly distributed about the center (C/L) of each pixel time interval.

In "0" heating resistor only one time slot is turned on or energized and that is, of course, number 11. In heating element 2 only two time slots are turned on, number 6 and 17.

The invention has been described in detail with particular reference to preferred embodiments thereof, but it will be understood that variations and modifications can be effected within the spirit and scope of the invention.

What is claimed is:

1. A head driving device for a continuous thermal transfer printer, comprising:

a driving circuit for selectively turning on and off a plurality of heating resistors incorporated in a thermal transfer printer head a number of times during a pixel time interval having a midpoint, the number of on times of each heating resistor corresponding to density gradation data associated with each pixel of a line in an image to provide a desired density gradation for such image pixel; and said driving circuit including means for turning on and off each heating resistor at times uniformly and symmetrically distributed in time about the midpoint of each pixel time interval.

2. A head driving device for a thermal transfer printer as set forth in claim 1, wherein said driving circuit includes:

a line memory for storing said density gradation data;

a readout control circuit for causing said density gradation data to be read from said line memory a number of times corresponding to a pixel maximum density gradation; and a data processing unit for supplying said thermal transfer printer head with signals for selectively driving said plurality of heating resistors on the basis of said density gradation data contained in said density gradation data every time said transfer data are received from said line memory so that each of said heating resistors is driven a number of times during a pixel time interval corresponding to the density gradation data associated with the respective heating resistors, wherein the turning on and off of said heating resistors is performed at times uniformly distributed about the time center of each pixel time interval.

* * * * *